United States Patent
Fabre et al.

(10) Patent No.: US 8,801,384 B2
(45) Date of Patent: Aug. 12, 2014

(54) AIRFOIL ATTACHMENT HOLDING AN AIRFOIL ROOT IN A BROACH FITTING

(75) Inventors: Adrien Jacques Philippe Fabre, Montrouge (FR); Jean-Noel Mahieu, Paris (FR); David Marsal, Saint Aubin de Medoc (FR)

(73) Assignee: SNECMA, Paris (FR)

( * ) Notice: Subject to any disclaimer, the term of this patent is extended or adjusted under 35 U.S.C. 154(b) by 626 days.

(21) Appl. No.: 13/041,913

(22) Filed: Mar. 7, 2011

(65) Prior Publication Data

US 2011/0217172 A1   Sep. 8, 2011

(30) Foreign Application Priority Data

Mar. 8, 2010 (FR) ...................................... 10 51656

(51) Int. Cl.
*B64C 11/06* (2006.01)

(52) U.S. Cl.
USPC .................................. 416/220 R; 416/219 R

(58) Field of Classification Search
USPC ............................ 416/205, 219 R, 220 R, 248
See application file for complete search history.

(56) References Cited

U.S. PATENT DOCUMENTS

| | | | |
|---|---|---|---|
| 3,752,600 A * | 8/1973 | Walsh et al. | 416/219 R |
| 5,263,898 A | 11/1993 | Elston, III et al. | |
| 5,431,541 A * | 7/1995 | Shaffer | 416/215 |
| 2006/0039791 A1 | 2/2006 | Kim | |
| 2008/0196247 A1* | 8/2008 | Ravi et al. | 29/889.2 |
| 2008/0226729 A1* | 9/2008 | Sullivan et al. | 424/489 |
| 2008/0273980 A1* | 11/2008 | Belmonte et al. | 416/214 A |
| 2009/0004008 A1* | 1/2009 | Richards | 416/145 |

FOREIGN PATENT DOCUMENTS

WO    WO 2010/007146 A1    1/2010

OTHER PUBLICATIONS

French Search Report issued Nov. 8, 2010, in Patent Application No. FR 1051656.

* cited by examiner

*Primary Examiner* — Edward Look
*Assistant Examiner* — Danielle M Christensen
(74) *Attorney, Agent, or Firm* — Oblon, Spivak, McClelland, Maier & Neustadt, L.L.P.

(57) ABSTRACT

An airfoil attachment including a support and flanks rising on it to delimit a broach compartment designed to receive and hold an airfoil root is provided. The flanks are machined so as to separate the portions and prevent a complete break of a flank and detachment of the airfoil when a crack develops because the crack is stopped by one of the notches.

10 Claims, 2 Drawing Sheets

AIRFOIL ATTACHMENT HOLDING AN AIRFOIL ROOT IN A BROACH FITTING

BACKGROUND OF THE INVENTION

1. Field of the Invention

The subject of the invention is an airfoil attachment holding an airfoil root in a broach fitting.

2. Description of the Related Art

This attachment can be used for usually metallic supports of composite airfoils, and more particularly for devices for which the airfoils have a variable pitch, in other words their inclination relative to the rotation direction varies depending on the actual speed so as to improve the aerodynamic performances and efficiency of the engine to which they belong.

The strength of the assembly between the airfoil and its attachment must be respected to prevent any risk of detachment of an airfoil during operation, with an extremely high kinetic energy that can cause corresponding damage in the adjacent parts of the aircraft. A satisfactory attachment may satisfy one of two designs; in a first design, the attachment is designed to resist all loads that are normally applied to it; and in the other design, initiating damage is accepted provided that it cannot lead to an immediate complete rupture and detachment of the airfoil, and the attachment will then be replaced during a maintenance operation. The first safe-life design has the disadvantage that its design is more expensive because it is important to guard against more numerous or more restrictive conditions. The second fail-safe design is preferred in this case, but it is also more difficult to apply appropriately in some circumstances, for example when the airfoil and its attachment are parts made of different materials made in a single piece assembly for which the strength is uncertain, because their connection depends partly on a bond.

For this invention, we will consider a different type of airfoil attachment comprising a support and two opposite flanks that rise up on this support delimiting a broach compartment that retains an airfoil root. The assembly is usually made by an airfoil root that is wider than its aerodynamic part and with flanks that overhang the root, delimiting a narrower opening of the compartment than the root. This design is described in other documents including document FR-A-2 933 955 belonging to the applicant. However, there is also a French patent application registered under number 10 51 116 in which the airfoil root is bolted into the attachment according to a fail-safe design representative of a different assembly. The main forces to which the support is exposed during operation originate from centrifugal forces applied to the airfoil that tend to pull the airfoil root out from the compartment; these forces are transmitted to the flanks in the form of tension, possibly accompanied by bending that tends to separate the flanks from each other. Cracks can appear vertically in line with the flanks on which the airfoil root bears during operation, or at a region at which the flanks are connected to the support, where stresses due to bending are highest. These cracks can propagate along the flanks and break them, which would be followed by detachment of the airfoil.

BRIEF SUMMARY OF THE INVENTION

The invention represents an attempt to avoid such a complete rupture of a flank of the attachment. It is characterised in that each flank is divided into portions by at least one notch from an upper edge at a distance from the support and leads to a region adjacent to the support.

A crack that appears in one of the portions of the flanks then can propagate only as far as the adjacent notch. The portion concerned can break, but this will not cause detachment of the airfoil and the small volume of this portion means that there will be no major damage to its surroundings. The break could possibly be detected by the development of vibrations due to the fact that the airfoil is held less firmly in place; it could also be observed during a periodic maintenance operation.

The notch advantageously extends through the two flanks as far as a bottom of the compartment, in other words through all portions vulnerable particularly to cracking and other damage in the flanks.

According to one remarkable characteristic, the portions may have different stiffnesses obtained either by using different thicknesses or stiffeners such as ribs and particularly attachment tabs of a platform covering the attachment; the simultaneous occurrence of damage in each portion is thus reduced.

The airfoil attachment according to the invention may be a pivot comprising a pivot pin extending under the support, on the other side of the broach compartment.

The invention also includes airfoil assemblies, particularly made of metal and composite material, and variable pitch propellers comprising this attachment.

BRIEF DESCRIPTION OF THE SEVERAL VIEWS OF THE DRAWINGS

Some purely illustrative embodiments will now be described with reference to the following figures.

DETAILED DESCRIPTION OF THE INVENTION

Figure 1:
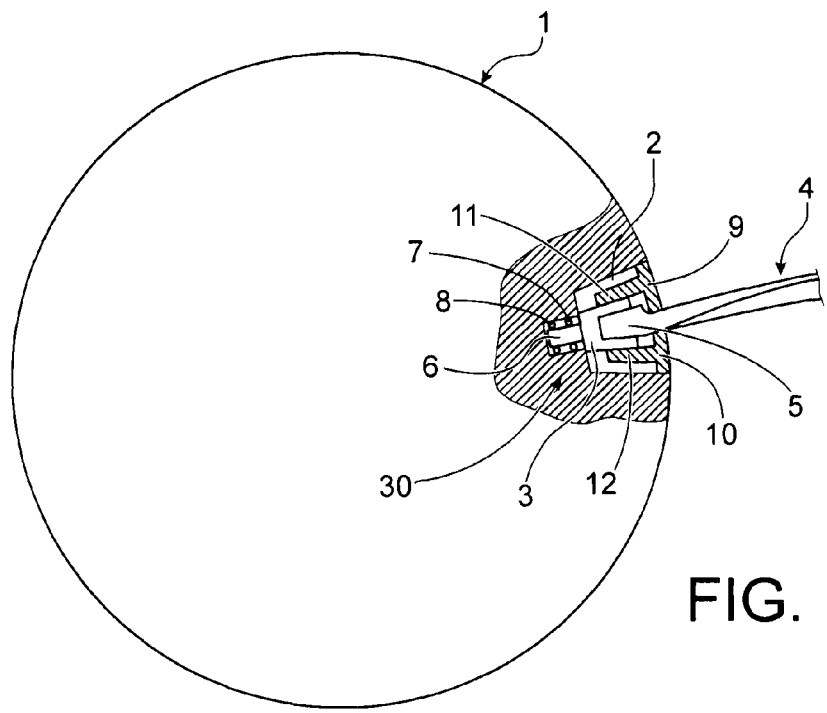
FIG. 1 shows a variable pitch propeller device on which the invention can be fitted.
Figure 2:
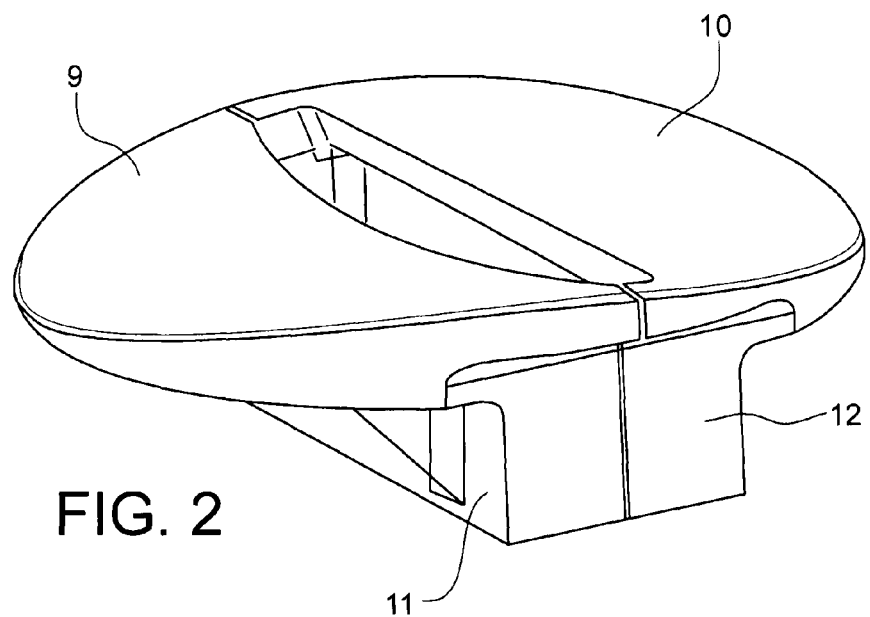
FIG. 2 shows an assembly of cover platforms.

FIG. 1 shows an overview of a propeller. It comprises a hub (1) in which housings (2) are machined in a circular row. The housings (2) hold a pivoting attachment (3) of an airfoil (4). A root (5) of the airfoil (4) is held in the attachment (30), and the remainder of the airfoil (4) extends outside the hub (1). The root (5) is wider than the remainder of the airfoil (4). The airfoil (4) may be made of a composite material, while the attachment (30) is metallic. A pin (6) of the support is held in place by ball bearings (7 and 8) or by other bearings formed in the bottom of the housing (2) and that pivots it by entraining the airfoil (4), the pitch of which is modified. The pivoting device in the attachment (30) does not form part of the invention and therefore is not shown. Two platforms (9 and 10), fixed to the support (3) by ribs (11 and 12) facing the inside of the compartment, cover the housing (2) to create a smooth surface on the hub (1) and extend on each side of the airfoil (4). The combination of the platforms (9 and 10) is shown in FIG. 2, without the airfoil (4).

Figure 3:
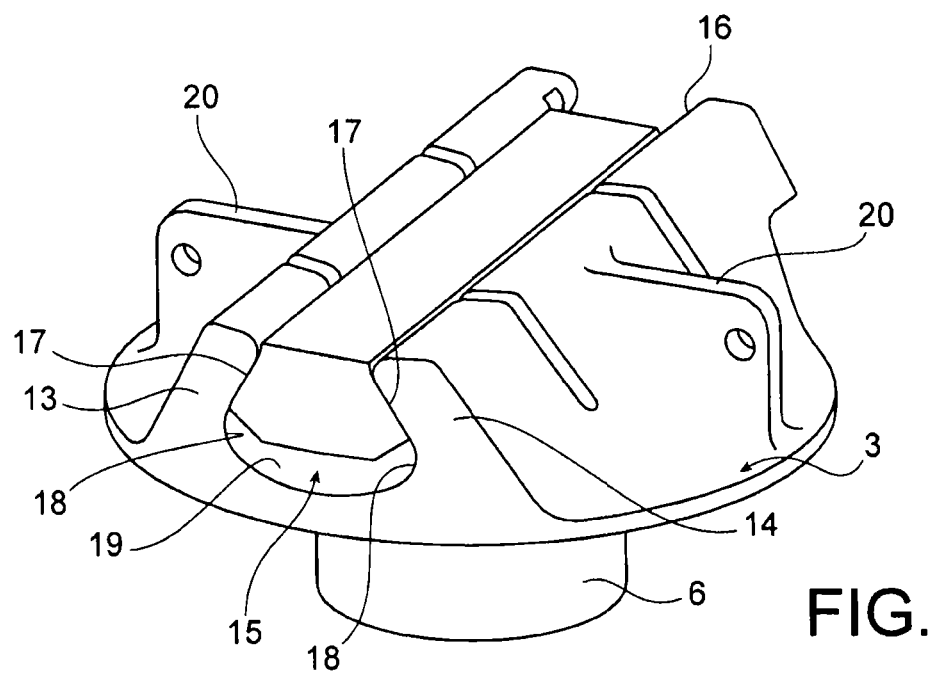
FIG. 3 shows an airfoil attachment according to the invention.

FIG. 3 shows the attachment (30) and the root (5) of the airfoil (4) in more detail. A central portion of the attachment (30) is a flat circular support (3). On the side opposite the pin (6), the support (3) comprises two straight symmetric flanks (13 and 14) opposite to each other that delimit a broach compartment (15) in which the root (5) is retained. The flanks (13 and 14) are inclined towards each other from the support (3) such that the compartment (15) communicates to the exterior through a clamped opening (16). The root (5) is provided with upper inclined flanks that are bearing on overhanging regions (17) of the flanks (13 and 14) when the centrifugal forces are applied on the airfoil (4) and tend to pull it out of the housing (15). Damage can occur at this location and at the rounded parts (18) of flanks (13 and 14) that correspond to connections to a bottom (19) of the compartment (15) at which stress concentrations occur due to bending of the flanks (13 and 14). The support (3) also comprises lateral ribs (20) on which the flanks (13 and 14) bear. These ribs (20) are tabs to which the platforms (9 and 10) are attached through bolts not shown.

Figure 4:
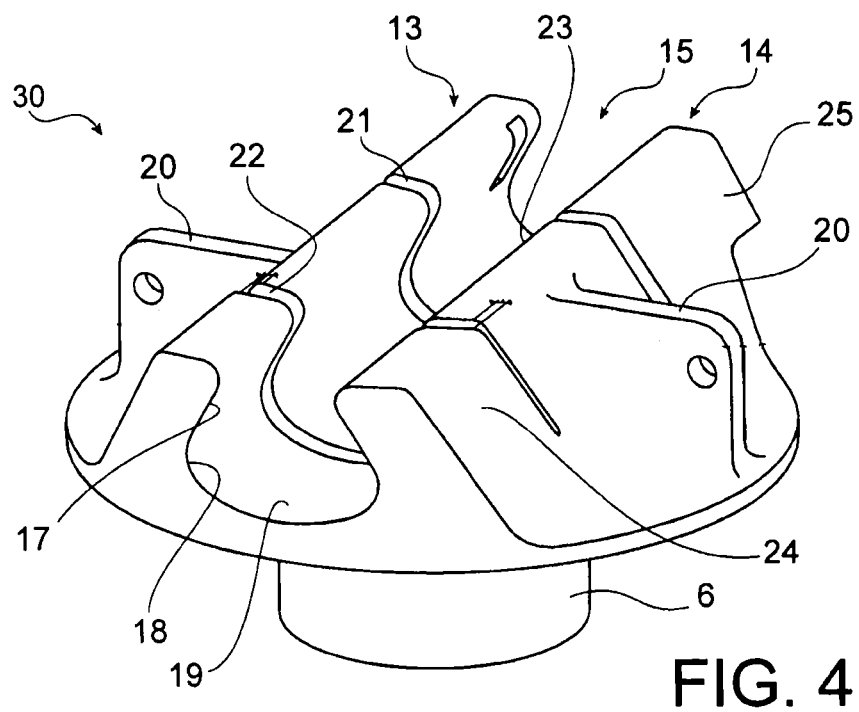
FIG. 4 is a similar view but without the airfoil.

Refer to FIG. 4 that specifically shows the characteristics of the invention and in which the attachment (30) is shown by itself, after the blade (4) has been removed. Notches (21 and 22), of which two are shown in the figure, have been made through the flanks (13 and 14) so as to divide them into portions among which a central portion (23) and two end portions (24 and 25) on each side of the central portion can be distinguished on each flank (13 and 14). The notches (21 and 22) extend as far as the free upper edge of the flanks (13 and 14) as far as the bottom (19) of the compartment (15) notching it slightly, such that they intersect not only the overhanging regions (17), but also the rounded parts (18), in other words the portions most exposed to damage. A crack appearing in one of the portions (23, 24 or 25) might cause rupture of this portion, but normally not the other portions because it will be stopped by the notch (21 or 22). The airfoil (4) will be held in place by the remaining portions which will be strong enough to hold it in place until the support (3) can be replaced. It is also more advantageous if the portions (23, 24 or 25) have different strengths in order to reduce the risk of simultaneous failure of several of them. Such a difference is obtained by the ribs (20) by reinforcing the central portions (23) to which they are connected. The portions (23, 24 and 25) may even comprise overthicknesses at their outer face (for portion 24, 25) with the same effect.

The invention claimed is:

1. An attachment for an airfoil comprising:
   a flat support that is perpendicular to a direction of the airfoil; and
   two opposite flanks that rise up on the support delimiting a broach compartment in which a root of the airfoil is retained, the flanks being inclined towards each other from the support such that the compartment communicates to an exterior through a clamped opening and the flanks presenting overhanging regions which bear against the root of the airfoil when centrifugal force is applied on the airfoil,
   wherein each of the flanks is divided into portions in a longitudinal direction of the compartment by at least one transverse notch from a free upper edge of the flank at a distance from the support, leading to a region adjacent to the support, the transverse notch extending through the free upper edge and the overhanging regions of both flanks and into a bottom of the compartment.

2. The airfoil attachment according to claim 1, wherein the portions have different stiffnesses.

3. The airfoil attachment according to claim 2, wherein one of the portions is bearing on an attachment rib of a platform covering the attachment.

4. The airfoil attachment according to claim 3, wherein the rib is an attachment tab of a platform covering the attachment.

5. The airfoil attachment according to any one of claims 2 to 4, wherein the portions have different thicknesses.

6. The airfoil attachment according to claim 1, wherein the attachment is a pivot comprising a pivoting pin extending under the support.

7. An airfoil assembly, comprising:
   an attachment according to claim 1; and
   an airfoil comprising a root engaged in the compartment and an aerodynamic part rising from the root through an opening of the compartment.

8. The airfoil assembly according to claim 7, wherein the attachment is metallic and the airfoil is made of a composite material.

9. A variable pitch propeller, comprising a circle of airfoil sets according to either of claim 7 or 8, the airfoil attachments being pivots.

10. The airfoil attachment according to claim 1, wherein the support is circular.

* * * * *